United States Patent Office 3,384,502
Patented May 21, 1968

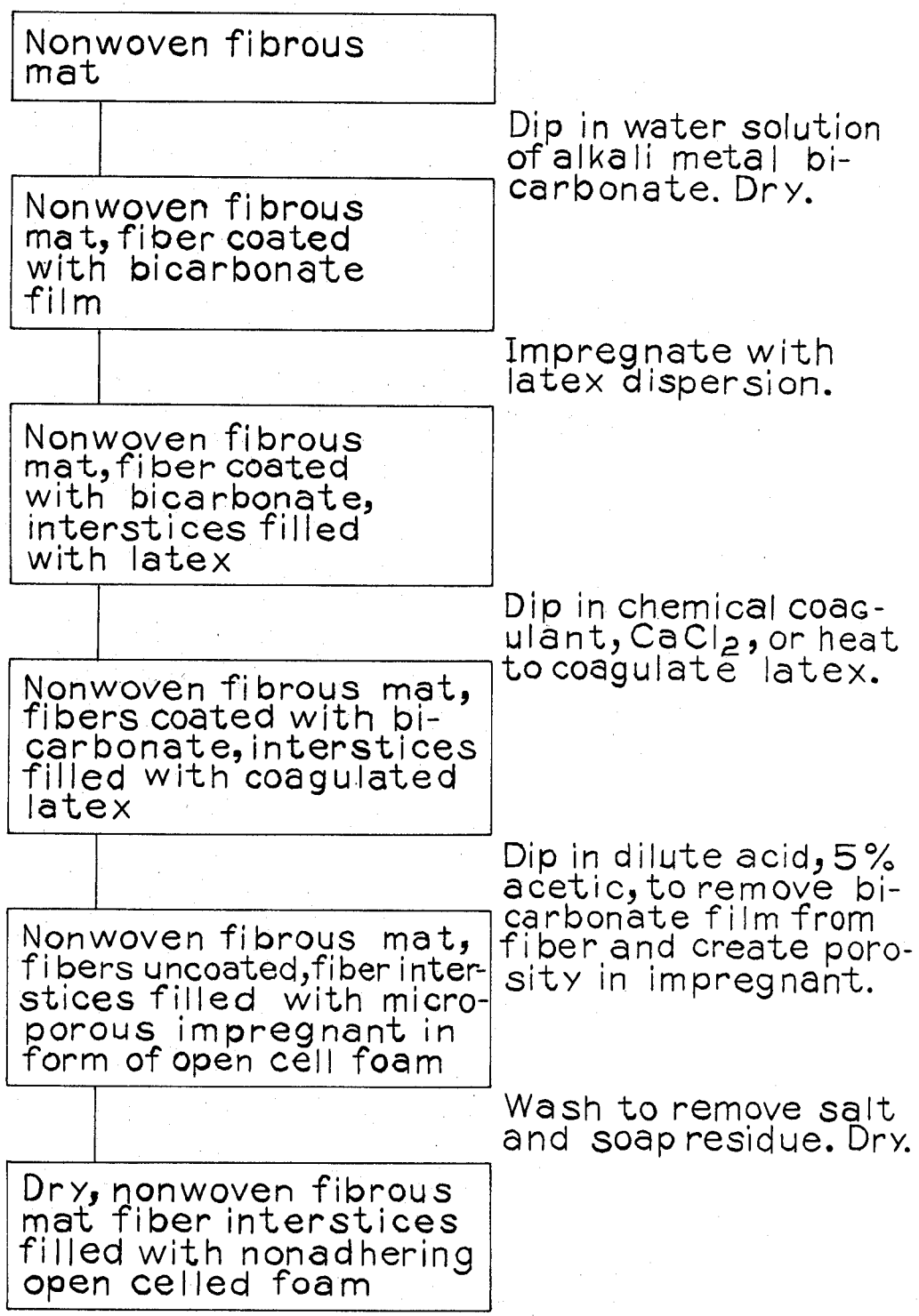

3,384,502
PROCESS FOR MAKING PERMEABLE SHEET MATERIAL
Archie B. Japs, Akron, Ohio, assignor to The B. F. Goodrich Company, New York, N.Y., a corporation of New York
Filed Nov. 2, 1964, Ser. No. 408,380
6 Claims. (Cl. 117—5.5)

This invention relates to leatherlike products and, more particularly, to a unique process for making such products by dipping non-woven fibrous webs into polymeric latex impregnants after first coating the web with a protective film which is impervious to said latex, but which can be removed by heat or chemical means after said latex is coagulated.

An object of the invention is to provide a leatherlike product which is acceptable as a substitute generally for leather. A further object is to provide a replacement for leather in protective clothing, including shoe uppers, where physical comfort requires the ability of the product to breathe. Another object is to provide an economical and practical process of preparing a leatherlike product which avoids the use of expensive organic solvents and the wasteful shrinkage of high cost synthetic fiber mats.

Artificial or simulated synthetic leather substitutes are well known. Much effort has been expended, with only partial success, in an effort to adapt synthetic polymers as substitutes in uses where leather is employed. Some of the synthetic compositions which have been used recently to replace leather have been vinyl polymers, and mixtures of rubbers and vinyl polymers combined in sandwich structures with woven and non-woven fabrics treated with similar synthetic polymers. None of these materials has been fully satisfactory as a leather substitute. Although many of them are outstanding in some aspects, they are ordinarily seriously deficient in one or more desirable or vital properties. From an application viewpoint one of the most notable failures of the substitute materials proposed to date has been lack of permeability to water vapor.

Coated fabrics as a class do not possess the ability to "breathe" or transpire water vapor and air. For suitable use in shoes, boots, gloves and the like which enclose or cover a part of the human body, this property is a prime prerequisite. If moisture from the body cannot escape through the article, hands and feet, for instance, in the case of gloves and shoes will feel and actually be damp. Such articles are uncomfortable, and particularly in the case of feet, may cause dermatological troubles.

Natural soft leathers, made from animal hides, have properties varying somewhat in texture and quality from batch to batch, and the making of large articles may require piecing and matching of pieces from a number of skins. The lack of product uniformity and extra handling are both undesirable and costly.

Attempts to make man-made leatherlike materials have included coating woven and non-woven fabrics with resins and latex compositions, sometimes containing plasticizers or softening agents, and applying flocks to fabrics which have been coated with certain compositions that give them a tacky, adherent surface. Such products, in the past, have always failed to match natural leather in general excellence of quality and appearance. Many lack the wear qualities of natural products. Others become stiff in time as plasticizers migrate. Some are initially too boardy; others lack permeability to air and moisture. Laundering and cleaning have presented problems.

U.S. Patents 3,067,482 and 3,067,483 described a method of making a synthetic suedelike material by shrinking a ligated fibrous mat between 30% and 90% of its planar area and impregnating the mat with a synthetic polymer solution, extracting the solvent, and drying. Flexible materials with a high degree of suppleness are obtained. Suppleness is expressed as bending stiffness in pounds per square inch obtained by dividing the cantilever value obtained in ASTM test D1388–55T by the cube of the thickness of the material. This extensive shrinkage of expensive fiber is very costly, however, and every use of solvents requires expensive precautions to handle the solvent, avoid its toxic effects, and reclaim it for reuse. The patents also describe impregnating shrunken fibrous mats, weighing between 4 and 7 oz. per sq. yd., in aqueous dispersions of polymers. These materials are prepared with very dilute impregnants (10–12% total solids) and, in the examples, show only about 30%–40% by weight of fiber of polymeric impregnant being deposited. They are satisfactory for some uses, but in preparing constructions to replace leather in shoe uppers it has been found that a non-woven web is preferably impregnated with polymer to a level of 85–250% of polymer on weight of fiber. High levels of polymer impregnation of the web are known to be best achieved by using high total solids impregnants. When a 35%, or higher, total solids latex is used to impregnate an unshrunken, untreated web to a level of 85–250% pickup of polymer, the product is normally stiff and boardy and cannot be processed by any known physical or chemical methods to exhibit the high level of suppleness shown in the examples of the patents where shrunken non-woven webs are impregnated with 7.5–12% total solids impregnants to a level of 30%–40% impregnant to weight of fiber, nor can these impregnated fabrics be sanded or buffed to preferentially remove polymer and leave a fiber surface having a "napped" appearance and feel.

This invention provides a process for preparing suedelike materials with a high degree of suppleness which does not require a planar area shrinkage of a non-woven fiber web before it is impregnated with a polymeric impregnant and also avoids the use of organic solvents. The process of the invention is readily followed by referring to the flowsheet drawing.

A major problem in making leatherlike materials has been to achieve products with a degree of resilience close to that of leather and yet to maintain the high moisture vapor permeability, flexibility and suppleness of leather. There is no satisfactory test for, or way to measure, the property of resilience, but it has been said that the resilience of leather is reflected in its high resistance to small radius bending and low resistance to large radius bending. Resilience gives the material crease resistance, and in an article of manufacture such as a shoe upper, it leads to improve vamp break and wrinkle resistance. When materials are produced according to this invention with a cured natural rubber latex impregnant, they exhibit high resilience, low compression set, and moderate suppleness. They are "lively." The resilience is greater than that exhibited by leather. If an acrylate latex or a polyvinyl chloride latex is employed in the method of the invention the product has low resilience, high compression set and is very "dead." The resilience is lower than that exhibited by leather. A natural rubber latex employed without the addition of curing compounds and coagulated by heat alone leads to a product having less resilience than one using a fully cured latex. Admixing natural rubber latex and acrylate latex, or varying the type of latex impregnant, leads to products with intermediate degrees of resilience more nearly approaching that of leather.

The method of this invention comprises coating a non-woven fibrous mat with a water solution of an alkali metal carbonate or bicarbonate salt and drying the same to leave the fibers completely coated, particularly at points of fiber intersection, with a solid film of the dry salt. In effect, the fabric will be "starched" with the carbonate salt. The carbonate film flexes with the fabric and does not flake off. The pretreated fabric is next dipped or otherwise impregnated with a latex, said latex optionally containing an additional quantity of dissolved alkali metal carbonate or bicarbonate. Optimum results have been found when the fabric is treated with a saturated carbonate solution and when the latex impregnation is carried to the highest level of polymer pickup on the fiber that can be obtained. For the purpose of this invention the term — alkali metal — is defined to include the ammonium ion. The deposited latex is coagulated by chemical treatment or by water evaporation. The carbonate film is then removed from the fiber surfaces to create open channels along the fibers. The carbonate film is preferably removed by decomposition with a dilute acid material which also decomposes the carbonate salt within the polymer saturant to generate gaseous carbon dioxide. The escaping gas transforms the polymeric impregnant to an open cell polymeric foam. Salt and soap residues are then readily removed by water washing the saturated fabric and a final drying completes the cure of the polymeric impregnant. An alternate means for removal of the carbonate after deposition of polymer is to accomplish its decomposition with heat alone.

It will be appreciated that various conventional steps such as roll compacting, doctor-knife leveling, wringing, pressing, dyeing, buffing, brushing, or adding softeners, water repellents, and flexible polymeric surface coatings, may be applied to the fibrous mat at conventional points in the overall process.

The deposited polymer impregnant surrounds the fibers, but, as seen in photomicrographs, does not adhere to the fibers. The impregnated fabric has a high level of vapor permeability and a high degree of suppleness, both properties being desirable characteristics for a leatherlike product intended for clothing or shoe uppers.

If the leatherlike product is intended for non-apparel use such as upholstery, luggage and the like, sufficient moisture permeability and suppleness can be achieved without adding carbonate to the impregnating polymer and by removing the carbonate film from the fibers by the action of hot water.

Greatly enhanced porosity and flexibility or suppleness at high density of the product are obtained by a process which employs no solvent other than water and which involves no wasteful initial shrinkage of the non-woven fiber base. The steps of the invention produce a structure comprising a highly porous, spongy, polymer network or matrix surrounding the textile fibers. The salt film has protected the fibers from the "sticking" propensity of the impregnating latex, and after the latex has been coagulated the removal of the salt film by heat or by the action of the dilute acid creates the porous network. The processed fabric is flexible and soft to the hand even at 100% or more pick-up of polymer based on the weight of fiber.

Non-woven fabrics are variously defined as felts, mats, webs, and the like. They embody natural or artificial fibers formed into a web or bat by carding, garneting, airlaying, water-laying and other methods known in the art. The initial fibrous mat will preferably weigh about 4 to 10 ounces per square yard. Non-woven fabrics contain randomly distributed short staple fibers. These non-woven webs can be made in various thicknesses and densities, and are often bonded together by the application of a minor amount of binder adhesive which can be applied by spraying, immersion, and the like. Typical binder adhesives are the synthetic latices of butadiene-styrene, butadiene-acrylonitrile, and the lower alkyl acrylates, methacrylates or copolymers thereof. The binder is usually present in an amount of 5–45% by weight of the non-woven fiber. It is preferable, in practicing this invention, to employ webs which contain no binder, but if binder is already in the web, it is not necessary to remove it before proceeding with the treating process. If heavier or thicker layers of non-woven fiber are needed than are readily produced, layers of non-woven fabric can be plied and adhered into one effective layer. The process of this invention can be applied to any natural or synthetic fiber. Wool, cotton, jute, rayon, polyamide (nylon), polyester (polyethylene terephthate), polyacrylonitrile and even asbestos and glass fibers may be used. The denier of the fiber employed is preferably about 1 to 3. Fiber lengths may range up to 4 to 5 inches.

Non-woven fabrics may be used in uncompressed or uncalendered thicknesses of about $1/64$ inch to 1 inch, or they may be calendered. Preferably, single ply uncalendered materials from about $1/32$-inch to $1/2$-inch apparent thickness are used. Multiple plies built up to these thicknesses are also useful. The density of the mat materials may be varied quite widely, and in terms of ounces per square yard may vary, depending on the nature of the fibers, from about 0.05 ounce to about 9 to 10 ounces. It is often desirable to have the non-woven mat or web given a certain degree of orientation by needle-punching on a loom that will pierce the mat up to 20,000 times per square inch with needles 1 to 10 mils in diameter. Needle punched fabrics also have greater density and strength than corresponding fabrics that have not been needled.

The alkali metal carbonates and bicarbonates are the preferred agents to coat the fiber or fabric to be treated by the method of the invention. The most preferred agent is sodium bicarbonate. Sodium carbonate, lithium, potassium and ammonium carbonates and bicarbonates may be used. It is essential that the carbonate-containing material be water soluble. The invention does not contemplate using organic solvents. The carbonate salt is applied to the fabric from a water solution of preferably 5 to 25 percent by weight salt concentration. For sodium bicarbonate, 9.1% solution, which is saturated at room temperature, has been found to give excellent results. If higher temperatures are used, more concentrated salt solutions will be effective.

It is critical to the invention that a carbonate, bicarbonate, or similar salt, that will decompose when exposed to heat or dilute acid, be used. The removal of the salt film, which has protected the fiber from attachment to the tacky latex impregnant, leaves a space so that the polymeric matrix surrounds, but is not attached to the fiber network. The preferred agent for the decomposition of the fiber protecting salt film is a dilute acid, preferably acetic acid.

Any water soluble or water dispersible polymeric impregnant which deposits a flexible film may be applied to the carbonate-coated fibers. The treated and dried fabrics are then uniformly more supple and more moisture permeable than the same fabrics saturated to the same level in the same polymeric latices without the treating process of the invention. Preferred polymers include natural rubber, butadiene-styrene, butadiene-acrylonitrile, polyacrylonitrile, polybutadiene, lower alkyl polyacrylates, polyvinyl chloride, polyurethanes (both polyetherurethanes and polyesterurethanes), polyesters, and the like. Carboxylic varities of the above-mentioned latices may also be used. The particular polymer is not critical to the invention. Variation in the kind of impregnating polymer makes possible variations in properties of the leatherlike material produced.

The fabric, impregnated and coated with carbonate solution, is dried to set the salt film on the fibers. The wet fiber may be squeezed to control the amount of absorbed solution before residual moisture is removed in heated air or by contact with a heated surface. Best results are achieved when the fiber is dried without excessive flexing. Drum driers, festooning racks in oven driers, and conveyor belts carrying the fabric through the drier are possible ways of accomplishing this step.

The dried, carbonate-coated fiber is then dipped in the polymeric impregnant, said polymer being in the form of emulsion or dispersion in water. Conditions of time, temperature, concentration and viscosity can be controlled to vary the amount of polymer deposited on the salt-coated fabric but it is preferable to saturate the given fabric as fully as possible with the given latex. It is often preferable that the latex total solids contain from 2 to 10 percent by weight of the same carbonate as the originally used carbonate solution or one of those carbonates or bicarbonates listed above. Presumably because of the salt film on the fiber, the polymer latex readily wets even synthetic fibers such as polypropylene which are normally difficult to wet since they have very low water absorbency.

The polymer enters the interstices between the carbonate-coated fibers and when the fiber web, containing 5 to 250 percent polymer based on weight of fiber, is dipped in an aqueous solution of calcium chloride or other chemical coagulant, the latex coagulates. Optionally, heat alone can be used to coagulate the deposited polymer. It is understood that known art for compounding latices for color, state of cure, and variations in physical properties, can be impressed upon the process of the invention to create variations in properties of the leatherlike webs.

After the impregnating polymer is coagulated, the fabric may be heated, immersed in dilute acid, preferably acetic acid, or washed in hot water to accomplish decomposition and/or removal of the salt. A water wash then removes salt and soap residues and leaves the fiber surrounded by a non-adhering polymer matrix.

A final drying in air or over drum driers produces an exceptionally flexible polymer-filled fabric web having desirable plumpness and an excellent hand. The material can then be sanded or buffed to raise a suedelike nap and can be adhered on one or both sides to other polymeric films to simulate types of leather other than suede. Hand is herein defined as the individual's reaction to the feel, softness, drapability, flexibility and lack of rubberiness or harshness.

A surprising feature of the invention is that a fiber web which has been coated with a dried carbonate film when dipped in a latex or dispersion usually picks up appreciably higher amounts of the polymer impregnant than does a similar untreated fiber web and yet after processing feels much softer to the hand than the untreated web, even if the latter is subjected to the same mechanical or chemical processing.

Alone the sheet material of this invention can be used for jackets and skirts. It will stand laundering and cleaning. The material is useful for insulation in clothing items, and as filter media and roll coverings. When adhered to an appropriate film, such as polyvinyl chloride, it makes an excellent upholstery material. When adhered to a permeable polyurethane or polyurethane-vinyl film, a satisfactory material for shoe uppers is produced.

Treated fabrics are evaluated for suitability as leather substitutes by testing them for degree of suppleness according to ASTM procedures D1388–55T and for moisture vapor permeability according to Federal Specifications on Leather; Methods of Sampling and Testing, Specification No. KK–L–311a, Method 8011. Moisture vapor transmission (MVT) can be measured and calculated as grams per square meter per twenty-four hours. Tensile strength, elongation and tongue tear strength are also measured.

It will be appreciated that variations in the properties of the final product can be made by one skilled in the art by varying the type of fiber in the web to be impregnated, the particular polymer employed as the impregnant, the amount of impregnant added to the fiber web and the degree of cure impressed on the polymeric impregnant. The dominant result of the invention is, that as opposed to the stiff, harsh, boardy fabric obtained by straight dipping of a fabric into a given polymer latex, soft, flexible, leatherlike compositions are obtained by impregnating the fabric with the latex after first completely coating the fibers with a subsequently decomposable salt. In addition, this leatherlike material is obtained without the use of any organic solvents or deliberate shrinkage of the fiber web.

The following preferred embodiments are intended to illustrate the invention. Parts and percentages are by weight. Immersions of fabrics in carbonate solutions or polymer latices are designed to result in the maximum possible pick-up of carbonate or polymer.

Example I

A non-woven fabric, consisting of 60% polypropylene, 40% rayon, formed by a carding and cross-laying technique from 1.5 denier, 1.5" long fibers, with a weight of 9.5 oz. per sq. yd., a thickness of 0.040", a density of 0.29 g./cc., needled to a level of 2300 punches per sq. in. is cut to provide four pieces, A, B, C, and D, each 6" by 6". Samples A and B are dipped in a 10% aqueous solution of sodium carbonate and dried at 90° C. Samples C and D are maintained as unpretreated controls. The four samples are then dipped in 35% total solids latex of carboxylic polyethylacrylate, pulled through squeeze bars to remove excess latex, and heated at 100° C. until the latex is coagulated. Samples A and C are immersed in 5% acetic acid; B and D are immersed in 5% hydrochloric acid. Finally the four samples are water washed and dried. A and B, the samples pretreated with carbonate, pick up 143% of polymer. Samples C and D pick up 125% by weight of polymer. In spite of the higher polymer pickup, A and B are more flexible than C and D and are also less translucent, which shows the polymer is less adherent to the fiber in A and B. Physically there appear to be no differences between A and B or C and D, but B and D, which are treated with hydrochloric acid, discolor slightly after prolonged heating at 100° C.

When another sample of the fabric is processed through the carbonate dip and drying, the latex dip and heat coagulation, and then is washed well with hot water, rather than immersing in dilute acid, and finally dried, the product also has greater flexibility and is softer to hand than that of samples C and D.

Example II

A 100% rayon non-woven web, formed by a carding and crosslaying technique from 1.5 denier, 1.5" long fibers, weighing 9.5 oz. per sq. yd., thickness 0.047", needled to a level of 2000 punches per sq. in., is saturated in a 13 to 1 water to sodium bicarbonate solution and dried at 100° C. The web picks up 22.4% carbonate by weight and is divided into 2 portions which are treated as follows:

(A) Immerse in 37.5% total solids, carboxyl-modified, heat curable, polybutadiene latex containing 3.9% sodium bicarbonate (based on rubber total solids), immerse in 5% calcium chloride, immerse in 5% acetic acid, water wash, dry.

(B) Immerse in 37.5% total solids, butadiene-acrylonitrile (70/30) copolymer latex containing 2.2% sodium bicarbonate (based on rubber total solids), immerse in 5% calcium chloride, immerse in 5% acetic acid, water wash and dry.

The products have the following properties:

| Sample | A | B |
| --- | --- | --- |
| Weight, oz./sq. yd | 20 | |
| Polymer pickup, percent on wt. of fiber | 120 | 181 |
| Thickness, in | .060 | .065 |
| Suppleness, p.s.i. | 31.2 | 55.3 |
| Density, g./cc | 0.41 | 0.48 |
| MVT, g./sq. m./24 hr | 1,156 | 1,102 |

Example III

A piece of the non-woven fabric, employed in Example I is divided into 3 portions and treated as follows:

(A) Untreated web is saturated in 35% total solids, carboxy-modified, heat curable, polybutadiene latex, and dried at 100° C.

(B) Untreated web is saturated in same latex as in A, and then dipped in 5% calcium chloride solution, dried, immersed in 5% acetic acid, washed with water, and dried at 100° C.

(C) Fabric web is pretreated by saturating in 9.1% aqueous sodium bicarbonate and drying at 100° C. The treated fabric is saturated in 35% total solids, carboxyl-modified, heat curable polybutadiene latex containing 6% sodium bicarbonate on latex total solids. The saturated web is passed through squeeze bars to remove excess impregnant, immersed in 5% calcium chloride to coagulate the impregnant, immersed in 5% acetic acid to remove the bicarbonate, water washed and dried at 100° C.

| Sample | A | B | C |
| --- | --- | --- | --- |
| Bicarbonate pickup on wt. of fabric, percent | | | 16.0 |
| Polymer pickup, percent | 100 | 86 | 104 |
| Observed "hand," low number is most desirable | 3 | 2 | 1 |
| Suppleness, p.s.i., lower value indicates more supple material | 277 | 157 | 36.9 |
| MVT, g./sq. m./24 hrs | 47 | 55 | 459 |
| Thickness, inches | .041 | .046 | .048 |

Samples A and B are stiff and crease when folded with force. The stiffness of B is somewhat reduced over that of A by the chemical treatment as well as by the lesser amount of saturant. Sample C, processed according to the method of the invention shows a tremendous improvement in suppleness and a great increase in moisture vapor permeability when compared to product of a simple latex saturation and coagulation.

Example IV

Three equal sized pieces of the non-woven fabric employed in Example I are processed as follows:

(A) Untreated fabrics immersed in 35% total solids, carboxyl-modified, butadiene-acrylonitrile (70/30) copolymer latex and dried at 100° C.

(B) Untreated fabric immersed in 35% total solids, carboxyl-modified, butadiene-acrylonitrile (70/30) copolymer latex, dipped in 5% calcium chloride, immersed in 5% acetic acid, washed with warm water and dried.

(C) Fabric is pretreated by immersion in 9.1% aqueous sodium bicarbonate solution and dried at 100° C. It is then immersed in 35% solids, carboxyl-modified, butadiene-acrylonitrile (70/30) copolymer latex containing 5% sodium bicarbonate on latex total solids, dipped in 5% calcium chloride, immersed in 5% acetic acid, washed in warm water and dried.

| Sample | A | B | C |
| --- | --- | --- | --- |
| Bicarbonate pick-up on wt. of fabric, percent | | | 14.1 |
| Polymer pickup, percent | 112 | 101 | 119 |
| Observed "hand" | 3 | 2 | 1 |
| Thickness, inches | .043 | .045 | .045 |
| Suppleness, lbs./sq. in | 277 | 199 | 71.5 |
| MVT, g./sq. m./24 hrs | 67 | 396 | 690 |

Dipping untreated fabric into latex gives a stiff, rubbery, low porosity product (A). Chemical treatment of such a product leads to some increase in flexibility and suppleness and to a somewhat improved MVT (B); however, when the fabric is initially pretreated with carbonate and the polymeric impregnant also contains carbonate, the carbonate is decomposed to greatly increase the suppleness and MVT of the product (C). As in Example III, the sample with the greatest polymer pick-up is the most supple, quite like fine calfskin leather.

Samples III–C and IV–C are sanded on a Curtin-Herbert oscillating drum sander to a thickness of .040" using No. 120 grit paper on both sides. The sanding raises a slight nap and gives a suedelike finish to the treated fabrics which are useful for linings in skirts, jackets and coats. A sanded portion of Sample III–C is laminated to a 20 mil film of a linear polyesterurethane polymer, employing a 10% solution of the polyesterurethane polymer in tetrahydrofuran as the adhesive. The composite structure is heated at 110° C. to remove solvent. The structure is subjected to extensive flexing on a leather Water Penetration Rate Flexer without showning any cracking or delamination. Sample IV–C is placed in a red aniline dyeing and coloring bath of a type used to color high grade leathers and proves fully amenable to the system.

Similarly, pieces of 100% propylene non-woven fabric, formed by carding and crosslaying technique from 1.5 denier, 1.5" long fibers, with weights of 9.5 oz. per sq. yd. and thickness of .040", needled to a level of 2000 punches per sq. in., is immersed in saturated aqueous solution of sodium bicarbonate, and dried at 100° C. A portion of the fabric is immersed in each of the latices described above and the same immersion, drying and sanding procedure is used.

| Fabric | Polypropylene | |
| --- | --- | --- |
| Sample | A | B |
| Bicarbonate pick-up on wt. of fabric, percent | 11.7 | 11.6 |
| Type of latex impregnant | (1) | (2) |
| Polymer pick-up, percent | 80 | 95 |

1 Polybutadiene.  2 Butadiene-acrylonitrile.

After light sanding, the fabrics produced are suedelike with a fine nap and good hand. The data indicates that, with the same non-woven fabric, the amount of polymer pick-up can be varied by changing the type of latex used as an impregnant.

In a similar manner a piece of the polypropylene/rayon non-woven fabric employed in Example I is coated with saturated aqueous sodium bicarbonate, immersed in 35% total solids, heat curable, polyethacrylate latex containing 6% sodium bicarbonate on the polymer, pulled through squeeze bars at .038", air dried, dipped in 2% calcium chloride solution, immersed in 5% acetic acid, washed with hot water and air dried overnight.

The fabric takes up 81.4% polymer based on weight of fabric. It is soft and flexible and is sanded to produce a suedelike nap. Plied to a film of polyvinyl chloride, the treated fabric forms an excellent upholstery material.

When a cotton fabric, 0.065" thick, density of 0.136, is treated according to the process of the invention, it picks up 11.1% by weight of sodium bicarbonate in the pretreatment and 266% by weight of polymer in impregnation. The product is soft to the touch and very flexible.

Example V

A piece of non-woven fabric, 60% polypropylene, 40% rayon, made of 1.5 denier, 1.5" long fibers by a carding and cross-laying technique with a thickness of 0.041", a density of 0.43 g./cc., a weight of 12.7 oz. per sq. yd., needled to a level of 1800 punches per sq. in. and containing 41% by weight on fiber weight of polyethylacrylate latex in binder form as received from the manufacturer, is dipped in saturated aqueous sodium bicarbonate and dried at 100° C. The pickup of bicarbonate amounts to 7.6%.

The carbonate coated fabric is dipped in 35% total solids, carboxyl-modified, heat curable, polybutadiene latex containing 8% sodium carbonate by weight. The sample is pulled through squeeze bars at .045", dipped in 5% calcium chloride solution, immersed in 5% acetic acid, washed in warm water, pulled through squeeze bars and dried at 100° C. Percent polymer pickup, based on textile fiber content, is 88.5%; total pickup of original binder plus new polymer is 129.5%.

The sample is sanded on both sides with No. 120 grit paper on a Curtin-Herbert drum sander along with a control piece of the original fabric. The sample treated according to the invention gives an improved finish and surface feel and has greater density. The process of the invention is equally applicable to fabrics containing polymeric binder as to those containing no binder.

Example VI

The polypropylene/rayon non-woven fabric employed in Example I is used to evaluate the effectiveness of the new process using a variety of latices to impregnate the fabric. One portion of fabric is left untreated (U) and a piece of this is immersed as is in each test latex as a control. A second portion of fabric is first immersed in saturated sodium bicarbonate solution and dried at 100° C. before immersion in the test latex. These samples are marked (T). The treated fabric picks up 7.9% by weight of fabric of the bicarbonate.

The latices described below are used in the evaluation. The untreated (U) samples of fabric are immersed in the given latex diluted to 35% total solids and pulled through squeeze bars to remove excess latex then dried at 100° C. The treated (T) pieces of fabric are immersed in the test latex containing 3.8% to 9.8% sodium bicarbonate based on the latex total solids, passed through squeeze bars to remove excess impregnant, coagulated by immersion in 5% calcium chloride solution, immersed in 5% acetic acid, then washed in warm water to remove soap,

|  | Grams |
|---|---|
| Terpolymer (43.2%) | 300 |
| Water | 63.5 |
| Sodium bicarbonate | 6.5 |
| Aquablack B (35%) | 7.4 |
| Zinc oxide (50% dispersion) | 3.9 |

(F) Carboxylic polybutadiene latex (butadiene 93%, acrylic acid 7%, 44.7% total solids. The formula for the impregnant is:

|  | Grams |
|---|---|
| Carboxylic polybutadiene (44.7%) | 300 |
| Water | 75.5 |
| Sodium bicarbonate | 7.5 |
| Aquablack B (35%) | 7.6 |

Data is set forth in Table 1:

TABLE 1

| Polymer | Polymer Pickup, percent by weight of fiber | | Thickness after sanding in inches | | Suppleness, p.s.i. | | MVT, g./m.²/ 24 hr. | | Tensile strength, p.s.i. | | Elongation, percent | | Tongue tear strength, lbs./oz./sq. yd. | |
|---|---|---|---|---|---|---|---|---|---|---|---|---|---|---|
|  | U | T | U | T | U | T | U | T | U | T | U | T | U | T |
| A | 89.6 | 89.3 | .034 | .0418 | 288 | 115 | 486 | 608 | 72 | 75.3 | 39 | 37 | .81 | 1.00 |
| B | 98.8 | 103 | .035 | .039 | 490 | 184 | 349 | 968 | 71 | 81.9 | 37 | 43 | .96 | .93 |
| C | 93.3 | 120 | .035 | .042 | 285 | 60 | 906 | 972 | 41 | 45.4 | 40 | 36 | .97 | .93 |
| D | 88.6 | 91.4 | .0365 | .044 | 530 | 60 | 678 | 1,054 | 58 | 45 | 35 | 35 | 1.18 | 1.09 |
| E | 94.7 | 98.3 | .0355 | .042 | 470 | 68 | 419 | 1,019 | 54 | 56.5 | 44 | 37 | 1.04 | 1.10 |
| F | 79.3 | 70.0 | .0375 | .0428 | 201 | 42 | 368 | 1,043 | 36 | 32 | 32 | 33 | .81 | .48 | and dried at 100° C. Some latices, such as polyvinyl chloride, do not coagulate in calcium chloride. Materials of this nature can be set on the fibers by partially drying in circulating warm air. The treated fiber is then passed on to the dilute acid and the rest of the process as described. All dried samples are sanded on both sides to produce a downy, napped surface. Where it is used, Aquablack B is added to the latex formulation to color the impregnant to give contrast to the white fibers.

The following latices are used for the impregnations:

(A) Natural rubber latex, ASTM Type 1, 61.5% total solids as received. The latex is compounded for cure as follows:

|  | Grams |
|---|---|
| Latex (61.5%) | 342 |
| Water | 204.5 |
| Sodium bicarbonate | 20.5 |
| Zinc oxide | 21.0 |
| Sulfur | 5.2 |
| Tetramethyl thiuram disulfide | 18.0 |

(B) Vinyl chloride acrylic latex, 53.5% total solids as received. The formula for the impregnant is:

|  | Grams |
|---|---|
| Vinyl chloride acrylic latex | 300 |
| Water | 144 |
| Sodium bicarbonate | 14.4 |

(C) Water dispersion of linear polyesterurethane polymer, 41% total solids. The formula for the impregnant is:

|  | Grams |
|---|---|
| Polyesterurethane dispersion (41%) | 300 |
| Water | 46.3 |
| Sodium bicarbonate | 4.7 |
| Aquablack B | 7.0 |

(D) Butadiene:acrylonitrile (70/30) copolymer latex, 41.2% total solids, the formula for the impregnant is:

|  | Grams |
|---|---|
| Butadiene:acrylonitrile latex (41.2%) | 300 |
| Water | 48.2 |
| Sodium bicarbonate | 4.8 |
| Aquablack B | 7.0 |
| Zinc oxide (50% dispersion) | 12.3 |

(E) Carboxylic terpolymer of butadiene (67%), acrylonitrile (26%), methacrylic acid (7%), 43.2% total solids. The formula for the impregnant is:

In every case the suppleness of the treated sample is superior to that of an untreated sample. For equivalent treatments on the same fabric, a range of suppleness from 184 to 42 p.s.i. is possible, just by varying the type of polymeric impregnant employed. Tensile, elongation and tongue tear of the treated fabrics compared to those of the untreated fabrics are relatively unaffected. Samples B, D, E and F exhibit significant increases in MVT as a result of the processing according to the invention. A representative MVT value for the calfskin leather control is 564 g./m.²/24 hr.

I claim:

1. The method of making flexible moisture vapor permeable sheet material which comprises the steps of immersing a fibrous mat in an aqueous solution of a material selected from the group consisting of alkali metal carbonates and bicarbonates to coat the entire sufaces and intersection points of said fibers with a film of said aqueous solution, drying said film to the solid state, impregnating said pretreated mat throughout with a polymeric latex, said latex filling the interstices between said coated fibers, but not adhering to said fibers themselves, coagulating said latex, dipping said mat in a dilute acid to react with the said carbonate solid film, washing said mat with water to remove salt and soap residues, and drying said mat.

2. The method of claim 1 in which the amount of said carbonate solid film deposited on the fibers is from 2 to 25% by weight of the fibers.

3. The method of claim 1 in which the latex is coagulated on said mat by immersion in calcium chloride solution.

4. The method of claim 3 in which the polymeric latex is a copolymer of butadiene and acrylonitrile.

5. The method of making flexible moisture vapor permeable sheet material which comprises the steps of immersing a nonwoven fibrous mat in an aqueous solution of a material selected from the group consisting of alkali metal carbonates and bicarbonates to completely coat the surfaces and the intersection points of said fibers with a film of said aqueous solution, drying said film to the solid state, the weight of said solid film amounting to 2% to 25% by weight of the said mat, impregnating said mat throughout with a polymeric latex containing up to 10% by weight on latex total solids of a material selected from the group consisting of alkali metal carbonates and bicarbonates, said latex filling the interstices between said coated fibers, but not adhering to said fibers themselves, coagulating said latex, dipping said mat in a dilute acid, washing said mat with water to remove salt and soap residues, and drying said mat.

6. The method of claim 5 wherein the polymeric latex is a polybutadiene latex.

References Cited

UNITED STATES PATENTS

| | | | |
|---|---|---|---|
| 2,006,687 | 7/1935 | Riddock et al. | 117—135.5 |
| 2,185,746 | 1/1940 | De Goencz et al. | 117—135.5 |
| 2,673,825 | 3/1954 | Biefeld et al. | 117—135.5 |
| 3,214,290 | 10/1965 | Larner et al. | 117—135.5 |

FOREIGN PATENTS

| | | |
|---|---|---|
| 712,129 | 7/1954 | Great Britain. |
| 730,221 | 5/1955 | Great Britain. |

WILLIAM D. MARTIN, *Primary Examiner.*

MURRAY KATZ, *Examiner.*

J. W. BORDERS, *Assistant Examiner.*